US012609645B2

(12) United States Patent
Fujiwara et al.

(10) Patent No.: US 12,609,645 B2
(45) Date of Patent: Apr. 21, 2026

(54) DUAL-MODE INVERTER SYSTEM

(71) Applicant: TOYOTA JIDOSHA KABUSHIKI KAISHA, Toyota (JP)

(72) Inventors: Kazuma Fujiwara, Kobe (JP); Hiroaki Toyoda, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 18/953,131

(22) Filed: Nov. 20, 2024

(65) Prior Publication Data

US 2025/0266781 A1 Aug. 21, 2025

(30) Foreign Application Priority Data

Feb. 16, 2024 (JP) ................................. 2024-022372

(51) Int. Cl.
| | |
|---|---|
| *H02P 27/06* | (2006.01) |
| *H02M 1/00* | (2006.01) |
| *H02M 1/32* | (2007.01) |
| *H02M 1/38* | (2007.01) |
| *H02M 7/5387* | (2007.01) |
| *H02P 25/022* | (2016.01) |
| *H02P 25/18* | (2006.01) |
| *H02P 29/60* | (2016.01) |

(52) U.S. Cl.
CPC .......... *H02P 27/06* (2013.01); *H02M 1/0003* (2021.05); *H02M 1/322* (2021.05); *H02M 1/38* (2013.01); *H02M 7/5387* (2013.01); *H02P 25/022* (2013.01); *H02P 25/18* (2013.01); *H02P 29/60* (2016.02)

(58) Field of Classification Search
CPC ............... H02M 1/0054; H02M 1/084; H02M 7/53871; H02M 7/5387; H02M 1/0003; H02M 1/322; H02M 1/38; H02P 27/06; H02P 25/18; H02P 25/022; H02P 29/60
See application file for complete search history.

(56) References Cited

U.S. PATENT DOCUMENTS

| | | | | |
|---|---|---|---|---|
| 8,344,677 B2 * | 1/2013 | Takizawa | ................. | H02M 1/32 |
| | | | | 318/500 |
| 2006/0108957 A1 * | 5/2006 | Urakabe | ................. | H02P 27/06 |
| | | | | 318/400.28 |

(Continued)

FOREIGN PATENT DOCUMENTS

| | | |
|---|---|---|
| JP | 2016-025776 A | 2/2016 |
| JP | 2018-014829 A | 1/2018 |
| JP | 2019-062726 A | 4/2019 |

*Primary Examiner* — Yusef A Ahmed
(74) *Attorney, Agent, or Firm* — SoraIP, Inc.

(57) ABSTRACT

The dual inverter system includes a first inverter connected to one end of a stator coil of the motor and a second inverter connected to the other end. The controller can execute a dual mode in which the motor is driven by two inverters and a single mode in which the motor is driven by only one inverter. The controller closes the upper SW elements of all of the first and second inverters, opens all the lower SW elements, and closes the connection switch when the voltage at the DC end of the first inverter exceeds the threshold voltage. Alternatively, the controllers close all the lower SW elements of the first and second inverters to open all the upper SW elements and close the connection switches.

2 Claims, 4 Drawing Sheets

(56)  References Cited

U.S. PATENT DOCUMENTS

| | | | |
|---|---|---|---|
| 2006/0164028 A1* | 7/2006 | Welchko | H02P 27/06 |
| | | | 318/105 |
| 2017/0234285 A1* | 8/2017 | Huh | H02J 7/1423 |
| | | | 123/179.4 |
| 2018/0278144 A1* | 9/2018 | Nakano | H02M 1/32 |
| 2019/0296663 A1* | 9/2019 | Oka | H02P 21/0003 |
| 2019/0296677 A1* | 9/2019 | Oka | H02P 21/18 |
| 2019/0296678 A1* | 9/2019 | Omata | H02P 29/50 |
| 2019/0386599 A1* | 12/2019 | Takahashi | H02P 7/291 |
| 2020/0106287 A1* | 4/2020 | Niimi | B60L 53/11 |
| 2020/0185953 A1* | 6/2020 | Shimizu | H02J 7/50 |
| 2020/0195166 A1* | 6/2020 | Horiuchi | B62D 6/00 |
| 2020/0244206 A1* | 7/2020 | Ohashi | B62D 6/00 |
| 2020/0274461 A1* | 8/2020 | Koikegami | H02M 7/53875 |
| 2020/0389115 A1* | 12/2020 | Saha | H02M 7/501 |
| 2021/0211084 A1* | 7/2021 | Kinjo | H02P 27/08 |
| 2021/0234491 A1* | 7/2021 | Takahashi | H02P 27/06 |
| 2021/0257947 A1* | 8/2021 | Kinjo | H02M 7/493 |
| 2021/0257953 A1* | 8/2021 | Kashiwazaki | H02P 27/06 |
| 2021/0265937 A1* | 8/2021 | Kashiwazaki | H02M 1/0054 |
| 2021/0297006 A1* | 9/2021 | Takahashi | H02M 7/537 |
| 2021/0384863 A1* | 12/2021 | Omata | H02P 25/22 |
| 2022/0077807 A1* | 3/2022 | Jeong | H02P 21/22 |
| 2022/0144114 A1* | 5/2022 | Bin | B60L 3/003 |
| 2022/0385211 A1* | 12/2022 | Jang | H02P 27/06 |
| 2022/0416560 A1* | 12/2022 | Jeong | B60L 53/24 |
| 2023/0017022 A1* | 1/2023 | Jeong | H02J 7/1492 |
| 2023/0023016 A1* | 1/2023 | Lee | H02P 27/08 |
| 2023/0073159 A1* | 3/2023 | Lee | H02P 27/06 |
| 2023/0115925 A1* | 4/2023 | Lim | H02P 27/14 |
| | | | 310/68 R |
| 2023/0170830 A1* | 6/2023 | Lee | H02P 21/22 |
| | | | 318/811 |
| 2023/0208337 A1* | 6/2023 | Yamamoto | H02P 25/22 |
| | | | 318/496 |
| 2023/0249566 A1* | 8/2023 | Kim | B60L 50/60 |
| | | | 320/109 |
| 2023/0253907 A1* | 8/2023 | Park | H02P 25/18 |
| | | | 318/811 |
| 2023/0253908 A1* | 8/2023 | Jeong | H02P 27/08 |
| | | | 318/504 |
| 2023/0268862 A1* | 8/2023 | Lian | H02M 7/5387 |
| | | | 307/10.1 |
| 2024/0198809 A1* | 6/2024 | Zhang | B60L 50/60 |
| 2024/0424930 A1* | 12/2024 | Lee | B60L 58/20 |
| 2025/0266781 A1* | 8/2025 | Fujiwara | H02P 27/06 |

* cited by examiner

DUAL-MODE INVERTER SYSTEM

CROSS-REFERENCE TO RELATED APPLICATION

This application claims priority to Japanese Patent Application No. 2024-022372 filed on Feb. 16, 2024, incorporated herein by reference in its entirety.

BACKGROUND

1. Technical Field

The technology disclosed by the present specification relates to a dual inverter system that includes two inverters and one open winding motor.

2. Description of Related Art

Japanese Unexamined Patent Application Publication No. 2018-014829 (JP 2018-014829 A) discloses an example of a dual inverter system. In the dual inverter system, an alternating current (AC) end of a first inverter is connected to one end of a stator coil of a motor, and an AC end of a second inverter is connected to the other end of the stator coil. When switching elements of the first inverter and the second inverter are synchronously turned ON and OFF, since a voltage twice as high can be applied to the motor as compared to when the motor is driven by one inverter, a high torque can be obtained by the motor. When a high torque is not necessary, the other end of the stator coil is interconnected to create a neutral point, and the motor is driven by only the first inverter. In the present specification, for convenience, the motor being driven by two inverters will be called a dual mode, and the motor being driven by only one inverter will be called a single mode.

Moreover, when a voltage at a direct current (DC) end of the inverter exceeds a predetermined threshold voltage or the like, a protection control is executed that consumes a current generated by an induced electromotive force of the stator coil while the motor inertially rotates. An example of a protection control is disclosed in Japanese Unexamined Patent Application Publication No. 2016-025776 (JP 2016-025776 A). The device disclosed in JP 2016-025776 A is a device that drives a motor by one inverter. JP 2016-025776 A discloses a protection control in which one of an upper switching element and a lower switching element is turned OFF and the other is turned ON after a predetermined standby time. A control that returns a current generated by an induced electromotive force of the stator coil by closing one of the upper switching element and the lower switching element is called an active short circuit control (or a zero vector control) (JP 2016-025776 A). In the specification, for convenience of explanation, a control that returns a current generated by an induced electromotive force of the stator coil by closing one of the upper switching element and the lower switching element will be abbreviated as an active short circuit (ASC) control.

SUMMARY

In the dual inverter system, a short circuit of the battery must be avoided when shifting from a single mode or a dual mode to an ASC control. The present specification provides technology, in a dual inverter system, that can shift to an ASC control (current is recirculated to a stator coil and consumed) while avoiding a short circuit of a battery in the same procedure, in either state of a single mode or a dual mode.

The dual inverter system disclosed by the present specification includes a first inverter, a second inverter, a motor, a connection switch, and a controller. A DC end of the first inverter is connected to a battery, and a plurality of AC ends is connected to respective ends of a plurality of stator coils of the motor on one side. A plurality of AC ends of the second inverter is connected to respective ends of the stator coils on another end. The connection switch connects a DC end of the second inverter to the battery and disconnects the DC end of the second inverter from the battery. The controller is capable of executing a dual mode in which the motor is driven by the first inverter and the second inverter by closing the connection switch, and a single mode in which the motor is driven by only the first inverter by opening the connection switch.

As is well known, an inverter includes a plurality of series circuits in which an upper switching element and a lower switching element are connected in series. The series circuits are connected in parallel between a positive electrode and a negative electrode of the DC end of the inverter. A midpoint of each series circuit is connected to each of the AC ends of the inverter. When a voltage of the DC end of the first inverter exceeds a predetermined threshold voltage, the controller executes one of the following upper short circuit control and lower short circuit control. In the upper short circuit control, the controller closes the connection switch along with closing all of the upper switching elements of the first and second inverters and opening all of the lower switching elements of the first and second inverters. In the lower short circuit control, the controller closes the connection switch along with closing all of the lower switching elements of the first and second inverters and opening all of the upper switching elements of the first and second inverters.

In the upper short circuit control, a current generated by an induced electromotive force of the stator coil is recirculated through the upper switching elements of the first and second inverters. In the lower short circuit control, a current generated by an induced electromotive force of the stator coil is recirculated through the lower switching elements of the first and second inverters. In either the dual mode or the single mode, a current can be consumed by recirculation to the stator coil, without the battery being short circuited, by shifting to the upper short circuit control (or the lower short circuit control).

The controller executes the upper short circuit control when a load of the upper switching element is less than a load of the lower switching element, and executes the lower short circuit control when a load of the lower switching element is less than a load of the upper switching element. A cumulative load of the upper switching element and the lower switching element is leveled, by separately using the upper short circuit control and the lower short circuit control.

The controller may return a current by the following procedures, as a protection control: (1) the controller opens the connection switch; (2) the controller closes upper switching elements and opens lower switching elements that are connected to respective ends of at least one stator coil, and opens upper switching elements and closes lower switching elements that are connected to respective ends of remaining stator coils; and (3) the controller closes the connection switch.

According to the above procedures, the current is recirculated by a loop in which the upper switching elements are closed, and the current is recirculated by a loop in which the lower switching elements are closed. A power loss in the stator coil becomes larger than a power loss in the upper short circuit control and lower short circuit control, and the current is rapidly attenuated.

Details of the technique disclosed in the present specification and further modifications will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a circuit diagram of a dual inverter system according to a first embodiment;

FIG. 2 is a circuit diagram showing the current flow during the upper short circuit control;

FIG. 3 is a schematic diagram showing the current flow during the lower short circuit control.

DETAILED DESCRIPTION OF EMBODIMENTS

First Embodiment

Figure 1:
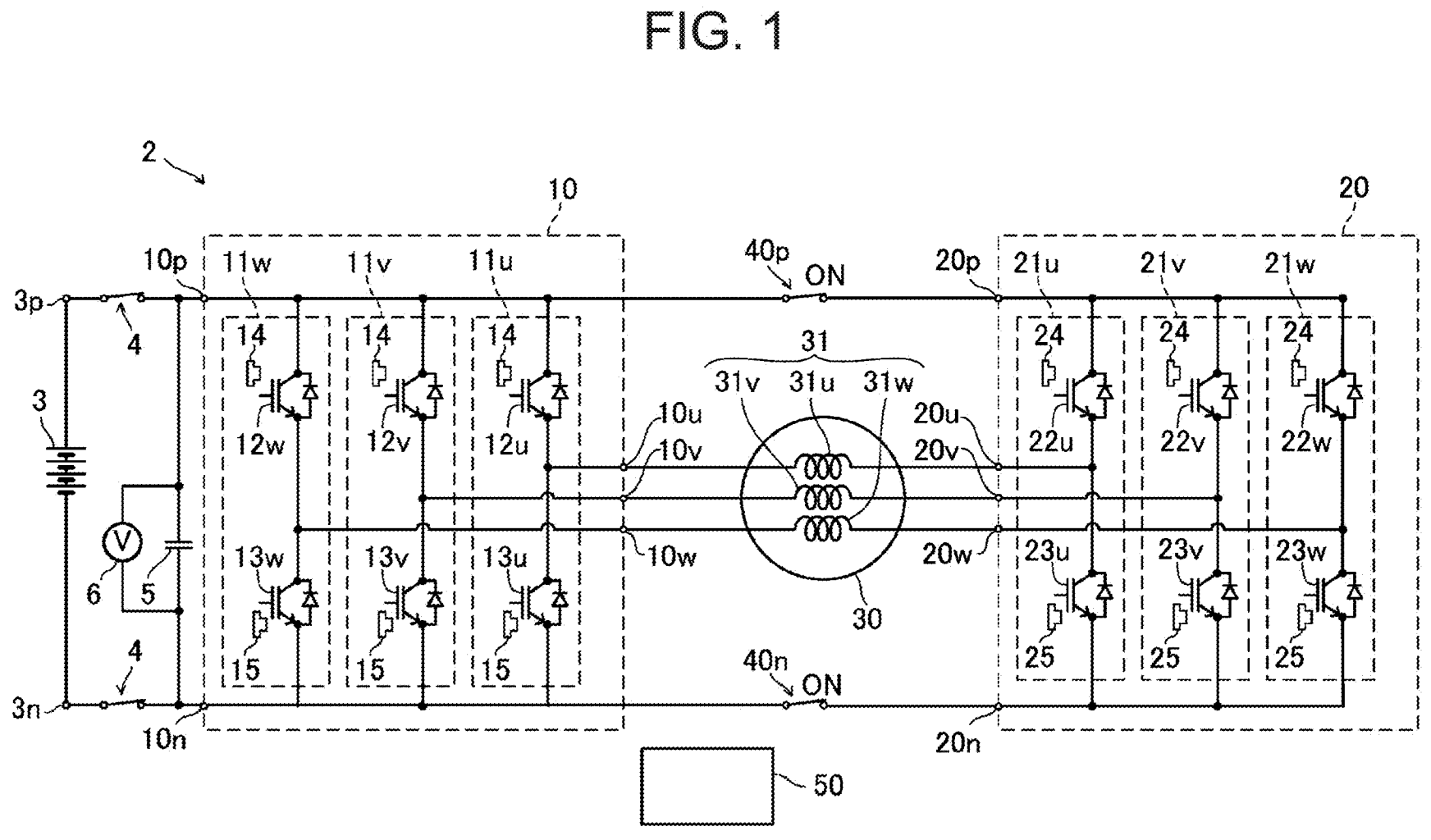
Figure 4:
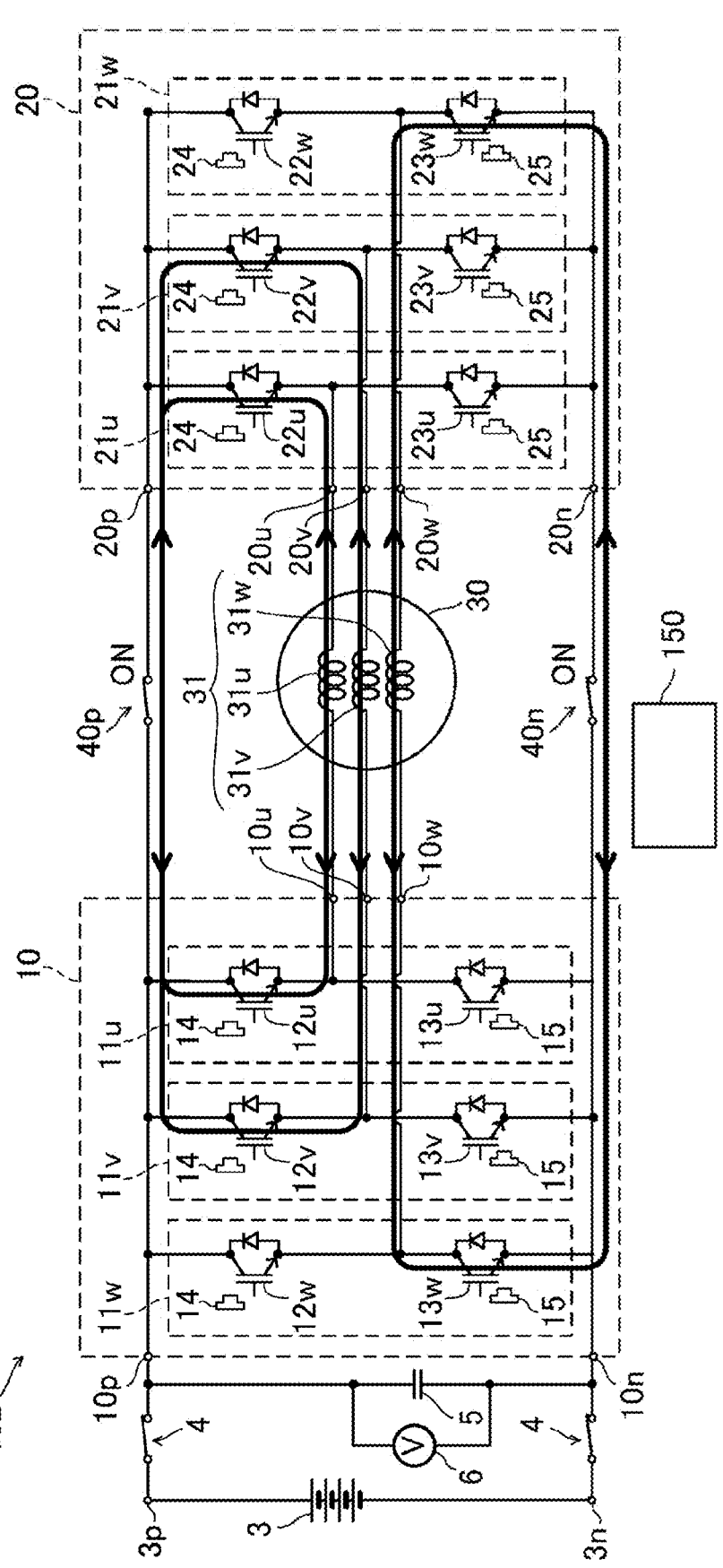
FIG. 4 is a diagram illustrating a flow of a return current in the dual inverter system of the second embodiment.

The dual inverter system 2 of the first embodiment will be described with reference to FIGS. 1-3. Hereinafter, for convenience of explanation, "dual inverter system" may be abbreviated as "DI system". FIG. 1 is a schematic diagram of a DI device 2. DI device 2 includes a battery 3, a first inverter 10, a second inverter 20, a motor 30, connection switches 40p, 40n, and controller 50. DI device 2 is mounted on, for example, a battery electric vehicle, and a motor 30 drives an axle.

The first inverter 10 includes a DC end (positive electrode 10p and negative electrode 10n) and AC ends 10u, 10v, 10w. The DC end is connected to the battery 3, and the AC end is connected to the motor 30.

The first inverter 10 includes three sets of series circuits 11u, 11v, 11w. The series circuit 11u includes a series-connected circuit of the upper switching element 12u and the lower switching element 13u. Hereinafter, for convenience of explanation, the "switching element" may be abbreviated as a SW element. The upper SW element 12 and the lower SW element 13 are connected in anti-parallel. The hardware of the diode may be a separate element from SW element or may be incorporated in the board of SW element.

The series circuit 11u is connected between the positive electrode 10p and the negative electrode 10n of the DC end of the first inverter 10. The upper SW element 12u is connected to the positive electrode 10p, and the lower SW element 13u is connected to the negative electrode 10n. The midpoint of the series circuit 11u, that is, the midpoint of the series-connected circuit of the upper SW element 12u and the lower SW element 13u is connected to the AC end 10u of the first inverter 10.

The series circuit 11v is composed of a series-connected circuit of an upper SW element 12v and a lower SW element 13v. The series circuit 11w is composed of a series-connected circuit of an upper SW element 12w and a lower SW element 13w. The series circuit 11v, 11w has the same construction as the series circuit 11u. Hereinafter, the upper SW elements 12u, 12v, 12w may be collectively referred to as the upper SW element 12, and the lower SW elements 13u, 13v, 13w device may be collectively referred to as the lower SW element 13.

Each upper SW element 12 is associated with a temperature sensor 14, and each lower SW element 13 is associated with a temperature sensor 15. A system main relay 4 is connected between the DC ends 10p, 10n of the first inverter 10 and the battery 3. When the system main relay 4 is closed, the first inverter 10 (and the second inverter 20) is connected to the battery 3. When the system main relay 4 is opened, the first inverter 10 (and the second inverter 20) is disconnected from the battery 3. A capacitor 5 is connected between the positive electrode 10p of the DC end of the first inverter 10 and the negative electrode 10n, and a voltage sensor 6 for measuring the voltage across the capacitor 5 (the voltage at the DC end of the first inverter 10) is provided.

For convenience of explanation, three sets of series circuit 11u, 11v, 11w may be collectively referred to as a series circuit 11. Three series circuits 11 are connected in parallel between the positive electrode 10p and the negative electrode 10n of the DC end of the first inverter 10. A midpoint of each of the three sets of series circuits 11 is connected to each of the AC ends 10u, 10v, 10w. The upper SW element 12 and the lower SW element 13 are driven by the controller 50. When the controller 50 alternately turns on and off the upper SW element 12 and the lower SW element 13 at a predetermined duty cycle, an alternating current flows through each of the three AC ends 10u, 10v, 10w.

The second inverter 20 has the same configuration as the first inverter 10, and includes three series circuits 21u, 21v, 21w. The second inverter 20 also uses a generic name similar to that of the first inverter 10. For example, three sets of series circuit 21u, 21v, 21w are collectively referred to below as series circuits 21. The same generic term is used for the upper SW elements 22u, 22v, 22w and the lower SW elements 23u, 23v, 23w.

Three series circuits 21 are connected in parallel between the positive electrode 20p and the negative electrode 20n of the DC end of the second inverter 20. Each of the series circuits 21 includes a series-connected circuit including an upper SW element 22 and a lower SW element 23. The upper SW element 22 and the lower SW element 23 are connected in anti-parallel. The upper SW element 22 is connected to the positive electrode 20p, and the lower SW element 23 is connected to the negative electrode 20n. The midpoint of the series-connected circuitry of the upper SW element 22 and the lower SW element 23 is connected to the AC end. The midpoint of the series circuit 21u (21v, 21w) is connected to the AC end 20u (20v, 20w).

Each of the plurality of upper SW elements 22 is associated with a temperature sensor 24, and each of the plurality of lower SW elements 23 is associated with a temperature sensor 25.

The motor 30 includes three stator coils 31u, 31v, 31w. One end of each of the three stator coils 31u, 31v, 31w (the left end of the stator coil in FIG. 1) is connected to each of the three AC ends 10u, 10v, 10w of the first inverter 10. The other end of each of the three stator coils 31u, 31v, 31w (the right end of the stator coil in FIG. 1) is connected to each of the three AC ends 20u, 20v, 20w of the second inverter 20. Hereinafter, the stator coils 31u, 31v, 31w may be collectively referred to as the stator coil 31.

The motor 30 is a three-phase AC motor. The suffix "u"/"v"/"w" of the symbol means each phase (u-phase, v-phase, w-phase) of three-phase alternating current. SW elements 12*u*, 13*u*, 22*u*, 23*u* are connected to the stator coil 31*u*. Similarly, SW elements 12*v*, 13*v*, 22*v*, 23*v* are connected to the stator coil 31*v*, and SW elements 12*w*, 13*w*, 22*w*, 23*w* are connected to the stator coil 31*w*.

In a normal motor, one end of each of the plurality of stator coils is connected to each of the plurality of AC ends of the inverter, and the other ends of the plurality of stator coils are connected to each other. A portion where the other ends of the plurality of stator coils are connected to each other is called a neutral point. In the motor 30, one end of the plurality of stator coils 31 is connected to the AC ends 10*u*, 10*v*, 10*w* of the first inverter 10, and the other end is connected to the AC ends 20*u*, 20*v*, 20*w* of the second inverter 20. The motor 30 having no neutral point is called an open winding type.

The DC ends 20*p*, 20*n* of the second inverter 20 are connected to the battery 3 via connection switches 40*p*, 40*n*. Specifically, the positive electrode 20*p* is connected to the positive electrode 3*p* of the battery 3 via the connection switch 40*p*, and the negative electrode 20*n* is connected to the negative electrode 3*n* of the battery 3 via the connection switch 40*n*. When the connection switches 40*p*, 40*n* are closed, the second inverter 20 is connected to the battery 3, and when at least one of the connection switches 40*p*, 40*n* are opened, the second inverter 20 is disconnected from the battery 3.

The controller 50 may drive the motor 30 using both the first inverter 10 and the second inverter 20. Specifically, the controller 50 closes the connection switches 40*p*, 40*n*. The upper SW element 12*u* and the lower SW element 13*u* of the series circuit 11*u* are alternately turned on and off. The upper SW element 22*u* of the series circuit 21*u* is turned on and off in a phase opposite to the upper SW element 12*u*, and the lower SW element 23*u* is turned on and off in a phase opposite to the lower SW element 13*u*. The same applies to other series circuits 11*v*/21*v* (11*w*/21*w*). The controller 50 interlocks SW elements of the first inverter 10 with SW elements of the second inverter 20 to turn them on and off.

When SW elements of the first inverter 10 and the second inverter 20 are driven in opposite phases as described above, the stator coil 31 can be energized twice as much as when the motor is driven by one inverter. That is, when the motor 30 is driven by two inverters (the first inverter 10 and the second inverter 20), a high torque is obtained. Driving the motor 30 by the first inverter 10 and the second inverter 20 by closing the connection switches 40*p*, 40*n* is hereinafter referred to as a dual mode.

The controller 50 may open the connection switches 40*p*, 40*n* and drive the motor 30 only by the first inverter 10. At this time, a neutral point is created in the second inverter 20. The controller 50 opens the connection switch 40*p*, closes all the upper SW elements 22 of the second inverter 20, and opens all the lower SW elements 23. Then, the other ends of the plurality of stator coils 31 (the right end of the stator coil 31 in FIG. 1) are short-circuited via the upper SW elements 22. That is, the other ends of the plurality of stator coils 31 are connected to the neutral point. The controller 50 turns on and off SW elements of the first inverter 10 as appropriate. The motor 30 is driven as a normal motor having a neutral point. The controller 50 using the second inverter 20 to create a neutral point and driving the motor 30 only by the first inverter 10 is hereinafter referred to as a single mode.

The controller 50 can create a neutral point in two ways: First, as described above, the controller 50 closes all the upper SW elements 22 of the second inverter 20 and opens all the lower SW elements 23. In another way, the controller 50 closes all the lower SW elements 23 of the second inverter 20 and open all the upper SW elements 22. The right ends of the stator coils 31 are short-circuited via the lower SW elements 23. In the single mode, the controller 50 opens the connection switches 40*p*, 40*n*.

When any problem occurs in the first inverter 10 or the second inverter, the voltage at the DC end of the first inverter 10 (the voltage between the positive electrode 10*p* and the negative electrode 10*n*) may be higher than the battery voltage. A capacitor 5 is connected to the DC end (positive electrode 10*p* and negative electrode 10*n*). When the DC end is in an overvoltage condition, the capacitor 5 and SW elements are damaged. In such a case, the controller 50 implements protection control. In the present specification, the protective control means a control in which a current generated by the induced electromotive force of the stator coil 31 is consumed while being recirculated to the stator coil through SW elements of the inverters. When shifting from the dual mode or the single mode to the protective control, the positive electrode 3*p* and the negative electrode 3*n* of the battery 3 must not be short-circuited.

When the voltage at the DC end of the first inverter 10 exceeds a predetermined threshold voltage, the controller 50 performs one of the following upper short circuit control and lower short circuit control as the protection control. In the upper short circuit control, the controller 50 closes all the upper SW elements 12 and 22 of the first inverter 10 and the second inverter 20, opens all the lower SW elements 13 and 23, and closes the connection switches 40*p*, 40*n*. In the lower short circuit control, the controller 50 closes all the lower SW elements 13, 23 of the first inverter 10 and the second inverter 20 to open all the upper SW elements 12, 22 and close the connection switches 40*p*, 40*n*.

Figure 2:
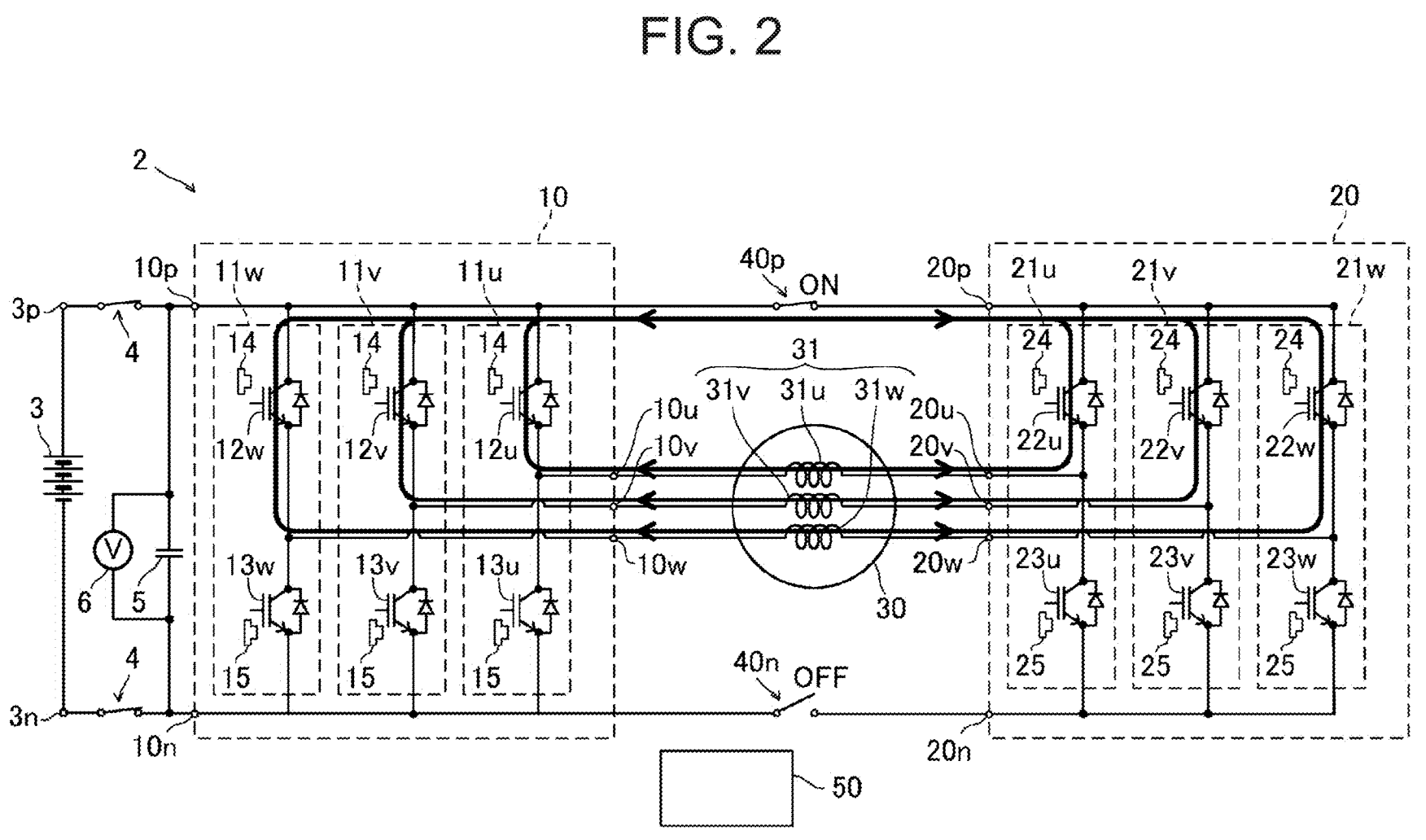

FIG. 2 shows the current flow during the upper short circuit control. The current generated by the induced electromotive force of the stator coil 31 flows back to the stator coil 31 through the connection switch 40*p* with the upper SW elements 12 and 22. The current decays over time. Consequently, the voltage at the DC end (the voltage between the positive electrode 10*p* and the negative electrode 10*n*) decreases.

Figure 3:
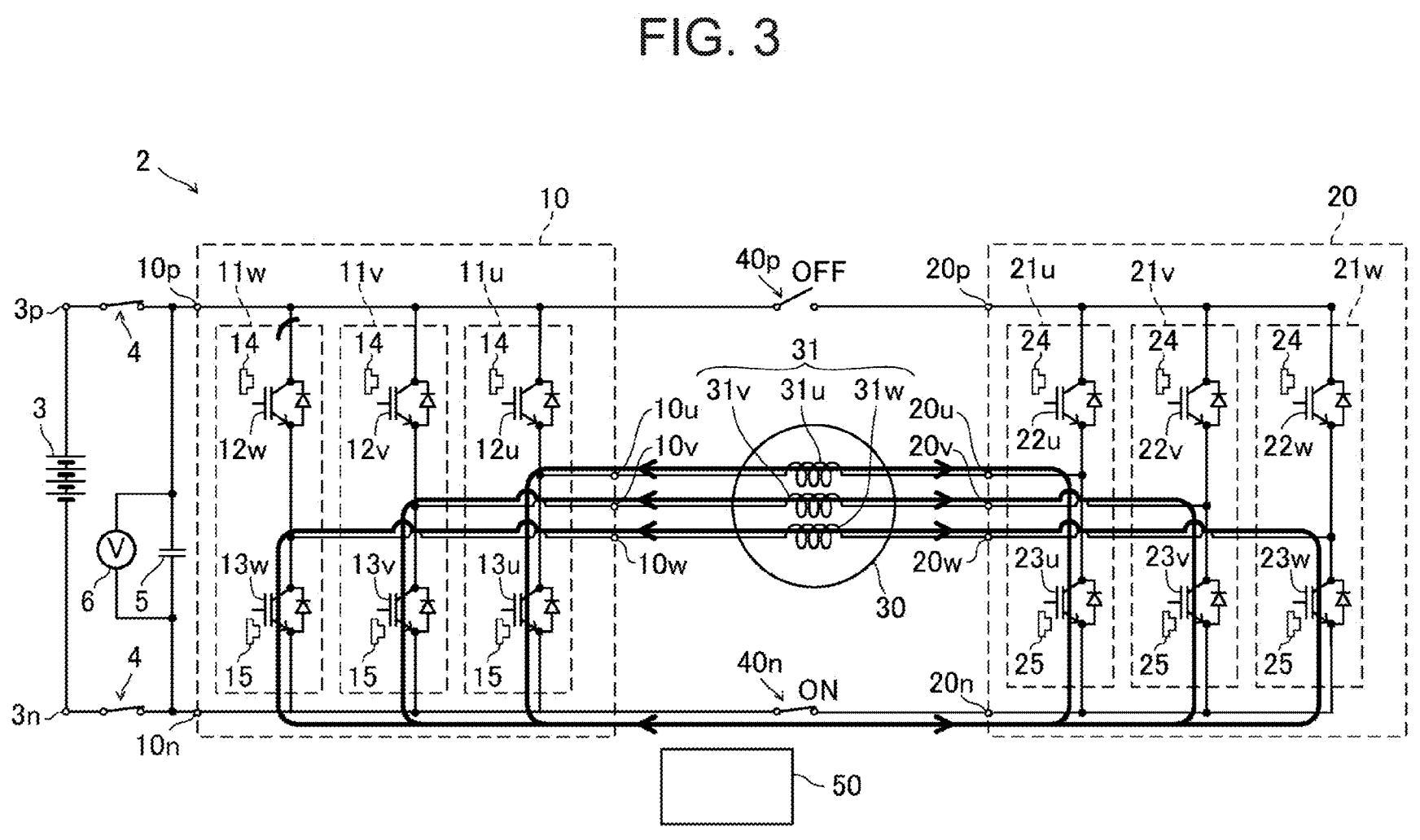

FIG. 3 shows the current flow during the lower short circuit control. The current generated by the induced electromotive force of the stator coil 31 flows back to the stator coil 31 through the connection switch 40*n* with the lower SW elements 13 and 23. The current decays over time. Consequently, the voltage at the DC end (the voltage between the positive electrode 10*p* and the negative electrode 10*n*) decreases.

As can be understood from FIG. 2 and FIG. 3, neither the upper short circuit control nor the lower short circuit control short-circuits the positive electrode 3*p* and the negative electrode 3*n* of the battery 3. In particular, when shifting from the dual mode to the up (down) short-circuit control and when shifting from the single mode to the up (down) short-circuit control, a short-circuit of the battery 3 is avoided in both cases.

The controller 50 may compare the loads of the upper SW elements 12 and 22 with the loads of the lower SW elements 13 and 23, execute the upper short circuit control when the loads of the upper SW elements 12 and 22 are small, and execute the lower short circuit control when the loads of the lower SW elements 13 and 23 are small. The cumulative loads of the upper SW elements 12, 22 and the lower SW elements 13, 23 are leveled. The load of SW element is specified based on the temperature, the driving time, and the number of times of driving of SW element.

Second Embodiment

FIG. 4 is a circuit diagram of DI device 102 according to the second embodiment. The circuit configuration of DI system 102 is the same as the circuit configuration of DI system 2 shown in FIG. 1. The reference numerals assigned to the respective components in FIG. 2 are the same except for the reference numerals of the controller. DI system 102 differs from the system 2 in that the protective control is DI. Therefore, the controllers of DI 102 are given the reference numeral 150.

As described above, the circuit configuration of DI system 102 is the same as the circuit configuration of DI system 2, and therefore, a description of the circuit is omitted.

When the voltage at the DC end of the first inverter 10 exceeds a predetermined threshold voltage, the controller 150 of DI system 102 performs the protective control in the following manner. (1) The controller 150 opens the connection switches 40p, 40n. (2) The controller 150 closes the upper SW elements 12, 22 connected to the respective ends of the at least one stator coil 31, opens the lower SW elements 13, 23, opens the upper SW elements 12, 22 connected to the respective ends of the remaining stator coils 31, and closes the lower SW elements 13, 23. (3) Controller 150 closes the connection switches 40p, 40n.

FIG. 4 illustrates an exemplary current flow in the protective control of DI device 102. In FIG. 4, the upper SW elements 12u, 12v, 22u, 22v connected to the respective ends of the stator coils 31u, 31v are closed, and the lower SW elements 13u, 13v, 23u, 23v are open. Further, the upper SW elements 12w, 22w connected to each end of the stator coil 31w is opened, and the lower SW elements 13w, 23w is closed. The current generated in the stator coils 31u, 31v is recirculated through the upper SW elements 12u, 12v, 22u, 22v and the connection switch 40p. On the other hand, the current generated in the stator coil 31w is recirculated through the lower SW elements 13w, 23w and the connection switch 40n.

According to the above-described steps, the current is recirculated in the loop in which the upper SW element is closed, and the current is recirculated in the loop in which the lower SW element is closed. The power dissipation in the connection switches 40p, 40n is larger than that in the above-described upper short circuit control and lower short circuit control, and the current is rapidly attenuated.

When the loads of the upper SW elements 12 and 22 are smaller than the loads of the lower SW elements 13 and 23, the controller 150 closes the upper SW elements 12 and 22 and opens the lower SW elements 13 and 23. When the loads of the upper SW elements 12 and 22 are larger than the loads of the lower SW elements 13 and 23, the controller 150 opens the upper SW elements 12 and 22 and closes the lower SW elements 13 and 23. The controller 150 performs this determination in each of the u-phase, the v-phase, and the w-phase. This process also equalizes the cumulative load of the upper SW element and the cumulative load of the lower SW element. As in the first embodiment, the loads of SW elements are determined based on the temperatures, the driving times, and the driving times of SW elements.

In the protective control of DI device 102 of the second embodiment, the connection switches 40p, 40n are opened prior to opening and closing SW elements. By this processing, it is possible to avoid a short circuit of the battery 3 when shifting from the dual mode or the single mode to the protection control.

In the protective control (upper short circuit control and lower short circuit control) of DI device 2 according to the first embodiment, the process of opening and closing SW elements and the process of closing the connection switches may be performed in any order. Short-circuiting of the battery 3 can be avoided even if the battery is performed in any order. In this respect, DI device 2 of the first embodiment is advantageous.

In addition, DI devices 2 and 102 can be switched to the protective control while avoiding a short circuit of the battery in the same manner in both the dual mode and the single mode.

Points to be noted regarding the technique described in the embodiment will be described. When the DC end and the AC end of the first inverter 10 are referred to as a first DC end and a first AC end, and the DC end and the AC end of the second inverter 20 are referred to as a second DC end and a second AC end, respectively, the circuitry of DI device 2 of the embodiment can be expressed as follows.

DI device 2 includes a motor 30 including a plurality of stator coils 31, a first inverter 10, a second inverter 20, connection switches 40p, 40n, and a controller 50. The first inverter 10 includes a first DC end and a plurality of first AC ends, the first DC end is connected to the battery 3, and each of the plurality of first AC ends is connected to one end of each of the stator coils 31. The second inverter 20 includes a second DC end and a plurality of second AC ends, the second DC end is connected to the battery 3, and each of the plurality of second AC ends is connected to the other end of each of the stator coils 31.

The connection switches 40p, 40n connect the second DC end to the battery 3 or disconnects the battery 3. The controller 50 may execute a dual mode in which the connection switches 40p, 40n are closed and the motor 30 is driven by the first inverter 10 and the second inverter 20, and a single mode in which the connection switches 40p, 40n are opened and the motor 30 is driven only by the first inverter 10.

The first inverter 10 includes a plurality of series circuits 11 connected in parallel to the first DC end. Each series circuit 11 includes a series-connected circuit of upper SW elements 12 and lower SW elements 13. A midpoint of the series connection circuit is connected to the second AC end.

The second inverter 20 includes a plurality of series circuits 21 connected in parallel to the second DC end. Each series circuit 21 includes a series-connected circuit of upper SW elements 22 and lower SW elements 23. A midpoint of the series connection circuit is connected to the second AC end.

The configuration of the inverter is expressed by another expression as follows. Each of the first inverter 10 and the second inverter 20 includes a plurality of series circuits 11 (21) connected in parallel between the positive electrode 3p and the negative electrode 3n of the battery 3. Each series circuit includes an upper SW element 12 (22) and a lower SW element 13 (23) connected in series between the positive electrode 3p and the negative electrode 3n of the battery 3, and a midpoint of the series connection is connected to the AC end.

The controller 50 performs one of upper short circuit control in which all upper SW elements of the first and second inverters are closed to open all lower SW elements and the connection switch is closed, and lower short circuit control in which all lower SW elements of the first and second inverters are closed to open all upper SW elements and the connection switch is closed, as a protection control when a voltage of the first DC end exceeds a threshold voltage.

The protection control is intended to attenuate the current generated by the induced electromotive force of the stator coil while rotating the motor 30 with inertia. By performing the protective control, the components of DI device can be protected from damage.

The techniques disclosed herein are also applicable to DI having four or more series circuitry and four or more stator coils.

In the present specification, the expression "turning on the switching element" means to make both ends of the switching element conductive, and the expression "turning off the switching element" means to electrically disconnect both ends of the switching element. However, since the diode is connected in anti-parallel to the switching element, even if the switching element is turned off, the recirculation of the current through the diode is allowed.

The expression "turning on the switching element" is equivalent to the expression "closing the switching element", and the expression "turning off the switching element" is equivalent to the expression "opening the switching element".

Although the specific examples of the present disclosure have been described in detail above, these are merely examples and do not limit the scope of claims. The techniques described in the claims include various modifications and alternations of the specific examples illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A dual inverter system comprising:
a motor that includes a plurality of stator coils;
a first inverter including a direct current end connected to a battery and a plurality of alternating current ends connected to respective ends of the plurality of stator coils on one side;
a second inverter including a direct current end connected to the battery and a plurality of alternating current ends connected to respective ends of the plurality of stator coils on another side;
a connection switch connected between the direct current end of the second inverter and the battery; and
a controller that is configured to execute a dual mode in which the motor is driven by the first inverter and the second inverter by closing the connection switch and a single mode in which the motor is driven by only the first inverter by opening the connection switch, wherein when a voltage at the direct current end of the first inverter exceeds a predetermined threshold voltage, the controller executes one of an upper short circuit control and a lower short circuit control, the upper short circuit control closing the connection switch along with closing all upper switching elements of the first inverter and the second inverter and opening all lower switching elements of the first inverter and the second inverter, and the lower short circuit control closing the connection switch along with closing all the lower switching elements of the first inverter and the second inverter and opening all the upper switching elements of the first inverter and the second inverter,
wherein the controller executes the upper short circuit control when a load of the upper switching elements of the first inverter and the second inverter is less than a load of the lower switching elements of the first inverter and the second inverter, and the controller executes the lower short circuit control when the load of the lower switching elements of the first inverter and the second inverter is less than the load of the upper switching elements of the first inverter and the second inverter.

2. A dual inverter system comprising:
a motor that includes a plurality of stator coils;
a first inverter including a direct current end connected to a battery and a plurality of alternating current ends connected to respective ends of the plurality of stator coils on one side;
a second inverter including a direct current end connected to the battery and a plurality of alternating current ends connected to respective ends of the plurality of stator coils on another side;
a connection switch connected between the direct current end of the second inverter and the battery; and
a controller that is configured to execute a dual mode in which the motor is driven by the first inverter and the second inverter by closing the connection switch and a single mode in which the motor is driven by only the first inverter by opening the connection switch, wherein when a voltage at the direct current end of the first inverter exceeds a predetermined threshold voltage, the controller is configured to:
(1) open the connection switch;
(2) close upper switching elements of the first inverter and the second inverter and open lower switching elements of the first inverter and the second inverter that are connected to respective ends of at least one of the plurality of stator coils, and then open upper switching elements of the first inverter and the second inverter and close lower switching elements of the first inverter and the second inverter that are connected to respective ends of remaining stator coils; and then
(3) close the connection switch,
wherein the controller executes an upper short circuit control when a load of the upper switching elements of the first inverter and the second inverter is less than a load of the lower switching elements of the first inverter and the second inverter, and the controller executes lower a short circuit control when the load of the lower switching elements of the first inverter and the second inverter is less than the load of the upper switching elements of the first inverter and the second inverter.

* * * * *